(12) United States Patent
Beauchesne-Martel

(10) Patent No.: US 10,822,104 B2
(45) Date of Patent: Nov. 3, 2020

(54) VARIABLE GEOMETRIES TRANSIENT CONTROL LOGIC

(71) Applicant: PRATT & WHITNEY CANADA CORP., Longueuil (CA)

(72) Inventor: Philippe Beauchesne-Martel, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/110,699

(22) Filed: Aug. 23, 2018

(65) Prior Publication Data

US 2019/0061969 A1 Feb. 28, 2019

Related U.S. Application Data

(60) Provisional application No. 62/551,429, filed on Aug. 29, 2017.

(51) Int. Cl.
| | | |
|---|---|---|
| *B64D 31/06* | (2006.01) | |
| *F01D 17/16* | (2006.01) | |
| *F01D 17/10* | (2006.01) | |
| *F04D 27/02* | (2006.01) | |
| *F02C 9/54* | (2006.01) | |
| *F02C 9/20* | (2006.01) | |

(52) U.S. Cl.
CPC ........... *B64D 31/06* (2013.01); *F01D 17/105* (2013.01); *F01D 17/16* (2013.01); *F02C 9/20* (2013.01); *F02C 9/54* (2013.01); *F04D 27/0246* (2013.01); *F05D 2220/323* (2013.01); *F05D 2270/03* (2013.01); *F05D 2270/053* (2013.01); *F05D 2270/061* (2013.01); *F05D 2270/304* (2013.01); *F05D 2270/309* (2013.01); *F05D 2270/54* (2013.01)

(58) Field of Classification Search
None
See application file for complete search history.

(56) References Cited

U.S. PATENT DOCUMENTS

| | | |
|---|---|---|
| 4,370,560 A | 1/1983 | Faulkner et al. |
| 6,735,955 B2 | 5/2004 | Mannarino |
| 6,758,044 B2 | 7/2004 | Mannarino |
| 8,474,271 B2 | 7/2013 | Miller et al. |
| 8,649,954 B2 | 2/2014 | Boyer et al. |
| 8,909,454 B2 | 12/2014 | Minto |

(Continued)

FOREIGN PATENT DOCUMENTS

GB 2119862 11/1983

*Primary Examiner* — Tamara L Weber
(74) *Attorney, Agent, or Firm* — Norton Rose Fulbright Canada LLP

(57) ABSTRACT

Herein provided are methods and systems for controlling an engine having a variable geometry mechanism. A power level difference between a requested engine power level and a current engine power level is determined at a computing device. The power level difference is compared to a predetermined power threshold at the computing device. When the power level difference exceeds the predetermined power threshold, a position control signal for changing a position of the variable geometry mechanism is generated and output at the computing device, the position control signal generated based on a requisite bias level, the requisite bias level being based on the power level difference.

14 Claims, 5 Drawing Sheets

(56) References Cited

U.S. PATENT DOCUMENTS

| | | | |
|---|---|---|---|
| 9,322,341 B2 | 4/2016 | Belleville et al. | |
| 9,494,085 B2 | 11/2016 | Cai | |
| 9,540,944 B2 | 1/2017 | Meisner et al. | |
| 9,732,625 B2 | 8/2017 | Cai | |
| 9,850,823 B2 | 12/2017 | Miduturi et al. | |
| 2003/0066294 A1* | 4/2003 | Mannarino | F04D 27/0246 60/773 |
| 2010/0281875 A1 | 11/2010 | Price et al. | |
| 2011/0016876 A1 | 1/2011 | Cataldi et al. | |
| 2013/0038072 A1 | 2/2013 | Miller et al. | |
| 2013/0236296 A1 | 9/2013 | Collopy et al. | |
| 2014/0053567 A1 | 2/2014 | Langenbacher | |
| 2014/0278014 A1* | 9/2014 | Belleville | F02D 29/02 701/110 |
| 2015/0113996 A1* | 4/2015 | Cai | F02C 9/54 60/773 |
| 2017/0211485 A1 | 7/2017 | Tramontin | |

\* cited by examiner

VARIABLE GEOMETRIES TRANSIENT CONTROL LOGIC

CROSS-REFERENCE TO RELATED APPLICATIONS

The present application claims priority under 35 U.S.C. 119(e) of Provisional Patent Application bearing Ser. No. 62/551,429 filed on Aug. 29, 2017, the contents of which are hereby incorporated by reference.

TECHNICAL FIELD

The present disclosure relates generally to gas turbine engines, and more particularly to compressor stages with variable geometry.

BACKGROUND OF THE ART

During aircraft operations consisting of rapid engine transitions from low to high power levels, it is desirable to reduce the response time of the engine in order to achieve a required power. For this purpose, inlet mass flow can be increased by accelerating the gas generator of the engine, thereby increasing the engine's power. This may be achieved by a variety of techniques. For instance, a bleed valve may be actuated either actively or passively.

However, active actuation of the bleed valve adds weight to the engine while passive actuation increases the gas path temperature and decreases the gas generator speed of the engine. The running line of the engine can alternatively be lowered to improve transient engine performance. This may however result in a decrease in the overall efficiency, an increase in specific fuel consumption, and maximum required operating gas generator speed of the engine while increasing the overall operating temperature thereof. Although casing treatment may also be used, this technique may lower the efficiency of the engine.

There is therefore a need for an improved method for controlling the transient power response of an engine.

SUMMARY

In accordance with a broad aspect, there is provided a method for controlling an engine having a variable geometry mechanism, comprising: determining, at a computing device, a power level difference between a requested engine power level and a current engine power level; comparing, at the computing device, the power level difference to a predetermined power threshold; and when the power level difference exceeds the predetermined power threshold, generating and outputting, at the computing device, a position control signal for changing a position of the variable geometry mechanism, the position control signal generated based on a requisite bias level, the requisite bias level based on the power level difference.

In some embodiments, the method further comprises, when the power level difference does not exceed the predetermined power threshold, maintaining the variable geometry mechanism at a steady-state position.

In some embodiments, the method further comprises determining, at the computing device, the requisite bias level by scaling the power level difference by a factor associated with a maximum bias level.

In some embodiments, the method further comprises determining, at the computing device, the maximum bias level based on an operating condition of the engine.

In some embodiments, scaling the power level difference by the factor comprises determining the factor based on the maximum bias level and a reference power level associated with the operating condition of the engine.

In some embodiments, the predetermined power threshold is related to a reference power level associated with an operating condition of the engine.

In some embodiments, the method further comprises determining, at the computing device, the predetermined power threshold based on an operating condition of the engine.

In some embodiments, obtaining the requested engine power level comprises estimating the requested engine power level.

In some embodiments, the position control signal is a first position control signal, wherein maintaining the variable geometry mechanism at the steady-state position comprises generating and outputting a second position control signal for the variable geometry mechanism based on an operating condition of the engine.

In some embodiments, the predetermined power threshold comprises a positive power threshold and a negative power threshold, and wherein comparing the power level difference to the predetermined power threshold comprises comparing the power level difference to the positive power threshold when the power level difference is positive and comparing the power level difference to the negative power threshold when the power level difference is negative.

In accordance with another broad aspect, there is provided an engine control system for a variable geometry mechanism, comprising a processing unit; and a non-transitory computer-readable memory communicatively coupled to the processing unit. The computer-readable memory comprising computer-readable program instructions executable by the processing unit for: determining a power level difference between a requested engine power level and a current engine power level; comparing the power level difference to a predetermined power threshold; and when the power level difference exceeds the predetermined power threshold, generating and outputting a position control signal for changing a position of the variable geometry mechanism, the position control signal generated based on a requisite bias level, the requisite bias level based on the power level difference.

In some embodiments, the computer-readable program instructions are further executable by the processing unit for, when the power level difference does not exceed the predetermined power threshold, maintaining the variable geometry mechanism at a steady-state position.

In some embodiments, determining the requisite bias level comprises scaling the power level difference by a factor associated with a maximum bias level.

In some embodiments, the computer-readable program instructions are further executable by the processing unit for determining the maximum bias level based on an operating condition of the engine.

In some embodiments, scaling the power level difference by the factor comprises determining the factor based on the maximum bias level and a reference power level associated with the operating condition of the engine.

In some embodiments, the predetermined power threshold is related to a reference power level associated with an operating condition of the engine.

In some embodiments, the computer-readable program instructions are further executable by the processing unit for determining the predetermined power threshold based on an operating condition of the engine.

In some embodiments, obtaining the requested engine power level comprises estimating the requested engine power level.

In some embodiments, the position control signal is a first position control signal, wherein maintaining the variable geometry mechanism at the steady-state position comprises generating and outputting a second position control signal for the variable geometry mechanism based on an operating condition of the engine.

In some embodiments, the predetermined power threshold comprises a positive power threshold and a negative power threshold, and wherein comparing the power level difference to the predetermined power threshold comprises comparing the power level difference to the positive power threshold when the power level difference is positive and comparing the power level difference to the negative power threshold when the power level difference is negative.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
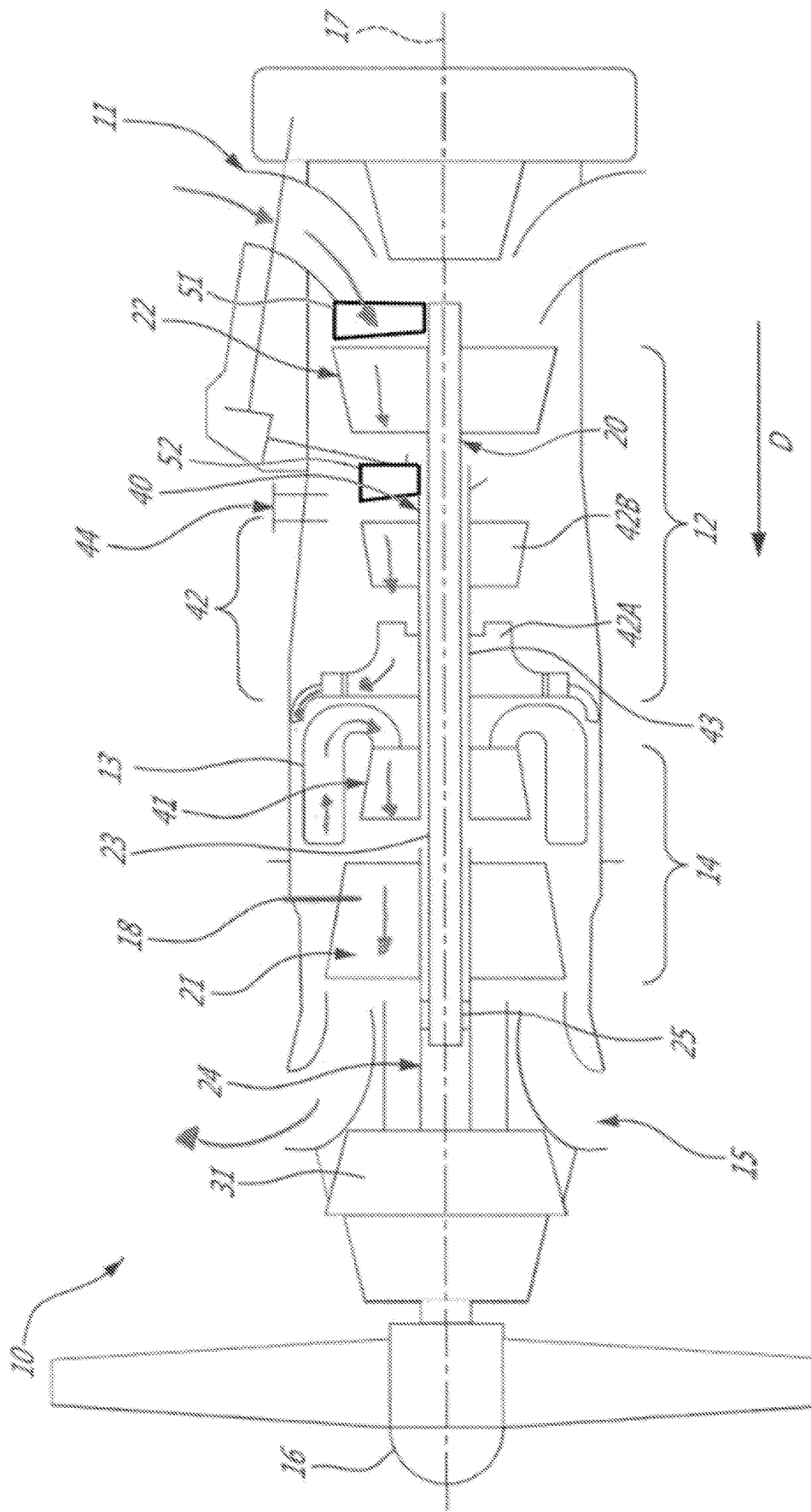
FIG. 1 is a schematic cross-sectional view of a gas turbine engine.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the gas turbine engine 10. The engine 10 includes a propeller 16 which provides thrust for flight and taxiing. The gas turbine engine 10 has a longitudinal center axis 17.

The gas turbine engine 10 (sometimes referred to herein simply as "engine 10") has a central core 18 defining a gas path through which gases flow as depicted by flow arrows in FIG. 1. The exemplified engine 10 is a "reverse-flow" engine 10 because gases flow through the core 18 from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the core 18 of the engine 10 disclosed herein can be better appreciated by considering that the gases flow through the core 18 in the same direction D as the one along which the engine 10 travels during flight. Stated differently, gases flow through the engine 10 from a rear end thereof towards the propeller 16.

Although illustrated as a turboprop engine, the gas turbine engine 10 may alternatively be another type of engine, for example a turbofan engine, also generally comprising in serial flow communication a compressor section, a combustor, and a turbine section, and a fan through which ambient air is propelled. A turboshaft engine may also apply. In addition, although the engine 10 is described herein for flight applications, it should be understood that other uses, such as industrial or the like, may apply.

Still referring to FIG. 1, the engine 10 has multiple spools which perform compression to pressurize the air received through the air inlet 11, and which extract energy from the combustion gases before they exit the core 18 via the exhaust outlet 15. According to the illustrated example, the engine 10 is provided in the form of a multi-spool engine having a low pressure (LP) spool 20 and a high pressure (HP) spool 40 independently rotatable about axis 17. However, it is understood that a multi-spool engine could have more than two spools. It should also be noted that the embodiments described herein also consider the use of single-spool engines.

The LP spool 20 includes at least one component to compress the air that is part of the compressor section 12, and at least one component to extract energy from the combustion gases that is part of the turbine section 14. More particularly, the LP spool 20 has a low pressure turbine 21 which extracts energy from the combustion gases, and which is drivingly engaged to an LP compressor 22 for pressurizing the air. The LP turbine 21 (also referred to as the power turbine) drives the LP compressor 22, thereby causing the LP compressor 22 to pressurize the air. Both the LP turbine 21 and the LP compressor 22 are disposed along the axis 17. In the depicted embodiment, both the LP turbine 21 and the LP compressor 22 are axial rotatable components having an axis of rotation that is coaxial with the center axis 17. They can include one or more stages, depending upon the desired engine thermodynamic cycle, for example.

In the depicted embodiment, the LP spool 20 has a power shaft 23 which mechanically couples the LP turbine 21 and the LP compressor 22, and extends axially between them. The shaft 23 is coaxial with the central axis 17 of the engine 10. The shaft 23 allows the LP turbine 21 to drive the LP compressor 22 during operation of the engine 10. The shaft 23 is not limited to the configuration depicted in FIG. 1, and can also mechanically couple the LP turbine 21 and the LP compressor 22 in any other suitable way provided that it transmits a rotational drive from the LP turbine 21 to the LP compressor 22. For example, the shaft 23 can be combined with a geared LP compressor 22 to allow the LP compressor 22 to run at a different rotational speed from the LP turbine 21. This can provide more flexibility in the selection of design points for the LP compressor.

Still referring to FIG. 1, the engine 10 includes an output drive shaft 24. The drive shaft 24 extends forwardly from the LP turbine 21 and is drivingly engaged thereto. In the illustrated example, the drive shaft 24 is distinct from the power shaft 23 and mechanically coupled thereto to be driven by the LP turbine 21. In the depicted embodiment, the drive shaft 24 and the power shaft 23 are coaxial and interconnected. FIG. 1 shows that the power and drive shafts 23, 24 are interconnected with a spline 25. The spline 25, which can include ridges or teeth on the drive shaft 24 that mesh with grooves in the power shaft 23 (or vice versa), allows for the transfer of torque between the drive shaft 24 and the power shaft 23. In the depicted embodiment, the power shaft 23 lies at least partially within the drive shaft 24, such that the spline 25 transfers the rotational drive or torque generated by the LP turbine 21 from the drive shaft 24 to the power shaft 23. The spline 25 can operate so that the power shaft 23 and the drive shaft 24 rotate at the same rotational speed. Other mechanical techniques can also be used to interconnect the power and drive shafts 23, 24. For example, the power and drive shafts 23, 24 can be interconnected by curvic coupling, pins, and interference fits. Other configurations of the drive shaft 24 and the power shaft 23 are also possible. For example, the drive shaft 24 and the power shaft 23 can be a single shaft driven by the LP turbine 21. The drive shaft 24 therefore transfers the rotational output of the LP turbine 21 in a forward direction to drive another component.

A rotatable load, which in the embodiment shown includes the propeller 16, is mountable to the engine 10, and when mounted, is drivingly engaged to the LP turbine 21, and is located forward of the LP turbine 21. In such a configuration, during operation of the engine 10, the LP turbine 21 drives the rotatable load such that a rotational drive produced by the LP turbine 21 is transferred to the rotatable load. The rotatable load can therefore be any suitable component, or any combination of suitable components, that is capable of receiving the rotational drive from the LP turbine 21, as now described.

In the embodiment shown, a reduction gearbox 31 (sometimes referred to herein simply as "RGB 31") is mechanically coupled to a front end of the drive shaft 24, which extends between the RGB 31 and the LP turbine 21. The RGB 31 processes and outputs the rotational drive transferred thereto from the LP turbine 21 via the drive shaft 24 through known gear reduction techniques. The RGB 31 allows for the propeller 16 to be driven at its optimal rotational speed, which is different from the rotational speed of the LP turbine 21.

Still referring to FIG. 1, the HP spool 40 with at least one component to compress the air that is part of the compressor section 12, and at least one component to extract energy from the combustion gases that is part of the turbine section 14. The HP spool 40 is also disposed along the axis 17 and includes an HP turbine 41 drivingly engaged (e.g. directly connected) to a high pressure compressor 42 by an HP shaft 43 rotating independently of the power shaft 23. Similarly to the LP turbine 21 and the LP compressor 22, the HP turbine 41 and the HP compressor 42 can include various stages of axial rotary components. In the depicted embodiment, the HP compressor 42 includes a centrifugal compressor 42A or impeller and an axial compressor 42B, both of which are driven by the HP turbine 41. During operation of the engine 10, the HP turbine 41 drives the HP compressor 42.

It can thus be appreciated that the presence of the above-described LP and HP spools 20, 40 provides the engine 10 with a "split compressor" arrangement. More particularly, some of the work required to compress the incoming air is transferred from the HP compressor 42 to the LP compressor 22. In other words, some of the compression work is transferred from the HP turbine 41 to the more efficient LP turbine 21. This transfer of work may contribute to higher pressure ratios while maintaining a relatively small number of rotors. In a particular embodiment, higher pressure ratios allow for higher power density, better engine specific fuel consumption (SFC), and a lower turbine inlet temperature (sometimes referred to as "T4") for a given power. These factors can contribute to a lower overall weight for the engine 10. The transfer of compression work from the HP compressor 42 to the LP compressor 22 contrasts with some conventional reverse-flow engines, in which the high pressure compressor (and thus the high pressure turbine) perform all of the compression work.

In light of the preceding, it can be appreciated that the LP turbine 21 is the "low-speed" and "low pressure" turbine when compared to the HP turbine 41. The LP turbine 21 is sometimes referred to as a "power turbine". The turbine rotors of the HP turbine 41 spin at a higher rotational speed than the turbine rotors of the LP turbine 21 given the closer proximity of the HP turbine 41 to the outlet of the combustor 13. Consequently, the compressor rotors of the HP compressor 42 may rotate at a higher rotational speed than the compressor rotors of the LP compressor 22. The engine 10 shown in FIG. 1 is thus a "two-spool" engine 10.

The HP turbine 41 and the HP compressor 42 can have any suitable mechanical arrangement to achieve the above-described split compressor functionality. For example, and as shown in FIG. 1, the HP spool 40 includes a high pressure shaft 43 extending between the HP compressor 42 and the HP turbine section 41. The high pressure shaft 43 is coaxial with the power shaft 23 and rotatable relative thereto. The relative rotation between the high pressure shaft 43 and the power shaft 23 allow the shafts 23, 43 to rotate at different rotational speeds, thereby allowing the HP compressor 42 and the LP compressor 22 to rotate at different rotational speeds. The HP shaft 43 can be mechanically supported by the power shaft 23 using bearings or the like. In the depicted embodiment, the power shaft 23 is at least partially disposed within the HP shaft 43.

The split compressor arrangement also allows bleed air to be drawn from between the HP compressor 42 and the LP compressor 22. More particularly, in the embodiment of FIG. 1, the engine 10 includes an inter-stage bleed 44 port or valve that is aft of the HP compressor 42 and forward of the LP compressor 22, which may provide for increased flexibility in the available bleed pressures. In a particular embodiment, the bleed pressure design point of the inter-stage bleed 44 is selected based on the pressure ratio of the LP compressor 22, which runs independently from the HP compressor 42. For operability, variable inlet guide vanes (VIGV) 51 and variable guide vanes (VGV) 52 can be used on the LP compressor 22 and at the entry of the HP compressor 42, together with the inter-stage bleed 44.

It should be noted that the engine of FIG. 1 represents only one example engine, and that the embodiments described herein can be applied to any other suitable manner of engine.

In some embodiments, the engine 10 includes one or more variable geometry mechanisms (VGMs) which may assist in achieving optimized engine transient response. In some embodiments, the VGMs consist of one or more VGVs, for instance the VIGV 51 and/or the VGV 52, which may be one of inlet compressor guide vanes for directing air into the compressor section 12, outlet guide vanes for directing air out of the compressor section 12, variable stator vanes for directing incoming air into rotor blades of the engine 10, and/or one or more variable nozzles, variable bleed-off valves, for instance the inter-stage bleed 44, and the like, or any suitable combination thereof. It should be understood that one or more of the above-mentioned VGMs may be adjusted for the purpose of decreasing the response time of the engine 10 during rapid engine transitions, e.g. from low to high power levels, or vice-versa. Indeed, adjustment of the position (e.g. the angle) of the VGMs can impact the inlet mass flow to the engine 10, and in turn allow the engine 10 to operate at a required power.

In some embodiments, as illustrated in FIG. 1, the engine 10 has a dual compression system with a low-spool compression system (LPC), including the LP spool 20, and a high-spool compression system (HPC), including the HP spool 40, which are separate from one-another. The VGMs include the VIGV 51 at the air inlet 11 near the LPC and the VGV 52 upstream of the HPC. In other embodiments, the engine 10 includes only one compression system, and includes fewer or more variable geometry mechanisms.

Figure 2:
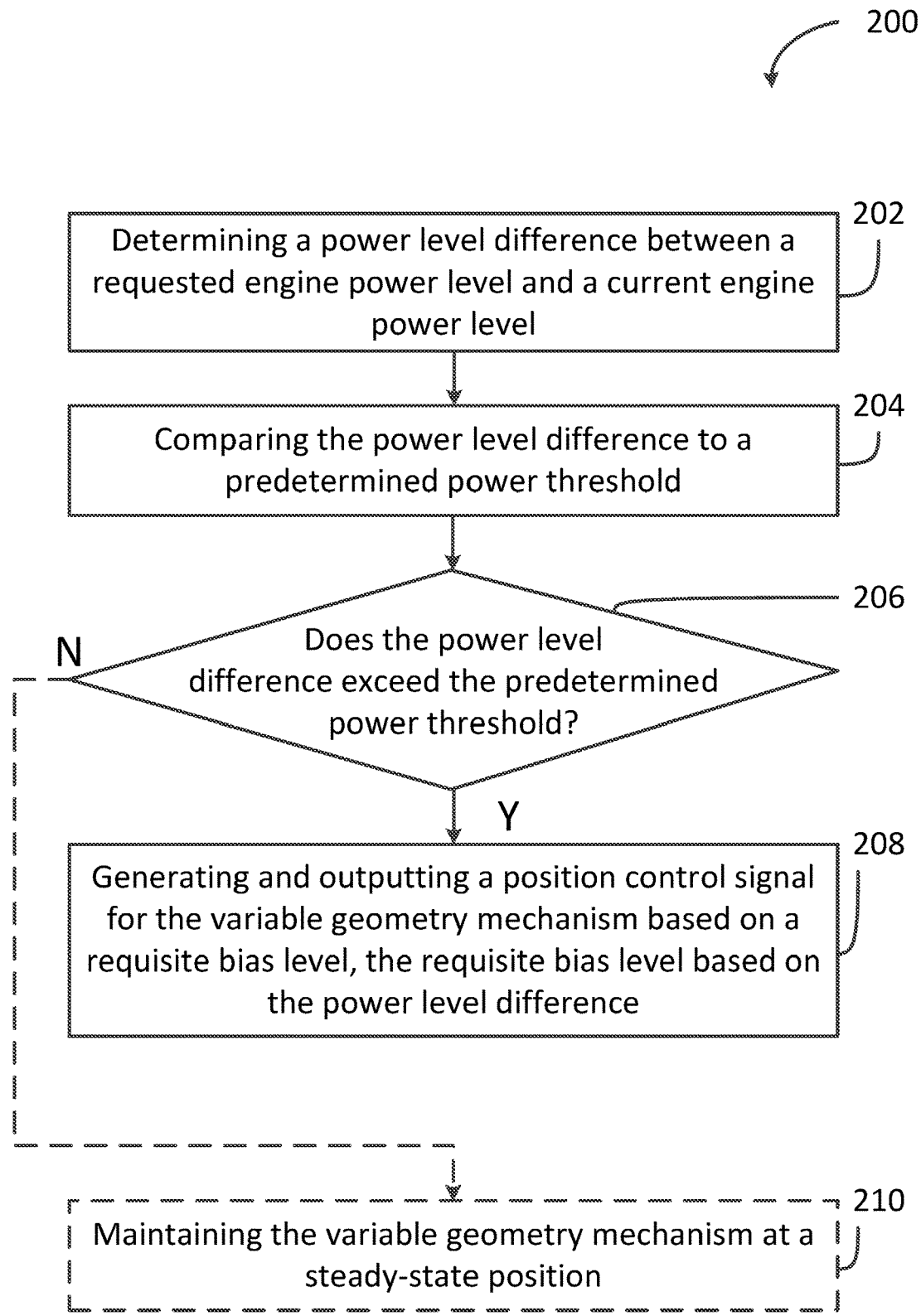
FIG. 2 is a flowchart illustrating an example method for controlling the engine of FIG. 1, in accordance with an illustrative embodiment.

With reference to FIG. 2, there is illustrated a flowchart of an example method 200 for controlling an engine, for example the engine 10, which may be a part of an aircraft. At step 202, a power level difference between a requested engine power level and a current engine power level is determined. In some embodiments, the requested engine power level is obtained when a request to alter the engine's power is provided, for example from an operator of the aircraft via one or more controls. The controls may include levers, pedals, switches, touchscreen-based controls, and the like. The requested engine power level may be obtained in any suitable format, including as a percent-change vis-à-vis a current engine power level, an absolute power level, a relative power level expressed as a portion of a maximum, and the like. In some embodiments, the method 200 is triggered to begin upon obtaining the requested engine power level for the engine 10. For example, a pilot or other operator of the aircraft may produce a requested engine power level via a thrust lever, which causes the method 200 to be commenced. In some embodiments, the requested power engine level is obtained via a digital power demand system. In other embodiments, the requested engine power level is obtained via a power setting map. In still further embodiments, the requested engine power level is estimated based on one or more inputs from a pilot or operator of the aircraft, and/or based on information acquired from one or more sensors in the engine 10 and/or the aircraft to which the engine 10 belongs.

In some embodiments, the current engine power level is obtained from a sensor or control system. In other embodiments, the current engine power level is estimated based on one or more readings obtained from sensors and the like. In still further embodiments, the current engine power level is substantially continuously monitored, and a value for the current engine power level at or near a time at which the requested engine power level is obtained is used for comparison purposes. In some embodiments, the power level is a thrust level for the engine 10; in other embodiments, a speed of the engine 10 is used as a proxy for the power level, or is used to derive or estimate the power level.

The difference between the current engine power level and the requested engine power level may be determined in any suitable way, using any suitable techniques. In some embodiments, the power level difference is a percent difference vis-à-vis the current engine power level, for example a percent increase or a percent decrease. In other embodiments, the power level difference is a value scaled to a particular maximum power level, or a reference power level which may be associated with one or more particular operating conditions or ratings of the engine 10. Still other methods of expressing the power level difference are considered, for example in absolute numbers, normalized numbers, and the like. In one particular embodiment, the power level difference is defined by $$SHP_{DIFF} = \frac{SHP_{RQ} - SHP}{SHP_{TO}} \quad (1)$$

where $SHP_{DIFF}$ is the power level difference, $SHP_{RQ}$ is the requested power level, SHP is the current power level, and $SHP_{TO}$ is a takeoff power level, which can be set based on the power level of the engine 10 during takeoff for the aircraft.

At step 204, the power level difference is compared to a predetermined power threshold. In some embodiments, the predetermined power threshold is obtained from a control system, or is determined based on one or more factors, for example one or more operating conditions of the engine 10. In some embodiments, the predetermined power threshold is based on a reference power level for the operating conditions of the engine 10. For example, a cruise flight condition is associated with a first reference power level, and a descent flight condition is associated with a second reference power level.

The comparison of the power level difference against the predetermined power threshold may be performed in any suitable way, using any suitable techniques. In some embodiments, different power thresholds are provided for each of positive and negative power level differences. For example, the power level difference is compared against a positive power threshold when the power level difference is positive (i.e. above 0), and against a negative power threshold when the power level difference is negative (i.e. below 0). In some embodiments, the positive and the negative power thresholds are determined independently from one another.

At decision 206, a determination is made regarding whether the power level difference exceeds the predetermined power threshold. In the affirmative case, the method 200 moves to step 208. In the negative case, the method 200 proceeds to step 210, described in greater detail hereinbelow.

In embodiments where positive and negative power thresholds are provided, the power level difference exceeding the predetermined power threshold may be evaluated as an absolute value. For example, the determination of whether a negative power level difference exceeds the negative power threshold is based on the absolute value of both the negative power level difference and the negative power threshold.

At step 208, a position control signal for the variable geometry mechanism is generated and output, based on a requisite bias level, which is based on the power level difference. The position control signal may be any suitable type of signal, encoded in any suitable format, and may be transmitted using any suitable communication medium. In some embodiments, the position control signal is output to the engine 10, or to a controller thereof, to cause a change in the position of the variable geometry mechanism. In other embodiments, the position control signal is output to the variable geometry mechanism itself.

The requisite bias level is indicative of a required change in the position of the variable geometry mechanisms of the engine 10, for example one or more of the VIGVs 51 and the VGV 42. In some embodiments, the requisite bias level is determined by scaling the power level difference by a factor associated with a maximum bias level. The factor may be based on the maximum bias level itself, on the maximum bias level and a reference power level associated with the operating condition of the engine 10, or with any other suitable parameters of the engine 10 and/or the aircraft. For example, the requisite bias level is determined as a change from a steady-state bias level, that is to say a current bias level which is maintained when the position of the variable geometry mechanisms of the engine 10 is not changed. In some embodiments, the requisite bias level is determined by the following equation $$B_{req} = B_{SS} + K \cdot B_{max} \quad (2)$$

where $B_{req}$ is the requisite bias level, $B_{SS}$ is the steady-state bias level, $B_{max}$ is the maximum bias level, and K is the scaling factor, which is a function of the power level difference $SHP_{DIFF}$, and the reference power level for the particular operating conditions of the engine 10. In some embodiments, the maximum bias level $B_{max}$ is obtained based on the operating condition of the engine 10, for example a power level for the engine 10. In some embodiments, the steady-state bias level $B_{SS}$ is obtained from a schedule or lookup table.

At step 210, following the determination that the power level difference does not exceed the predetermined power threshold, the variable geometry mechanism is maintained at a steady-state position, that is to say that the variable geometry mechanisms are maintained in a current or existing position. In some embodiments, the variable geometry mechanism is configured for maintaining the steady-state position absent any input from a control system or the like. In other embodiments, a steady-state position control signal is generated and output to indicate to the variable geometry mechanism that the steady-state position is to be maintained. The steady-state position control signal may be substantially similar to the position control signal discussed hereinabove, but indicating that the variable geometry mechanism is to maintain the steady-state position. In some embodiments, the position control signal is output to the engine 10, or to a controller thereof, to cause the variable geometry mechanism to maintain the steady-state position. In other embodiments, the position control signal is output to the variable geometry mechanism itself.

In this fashion, requests to change the power level of the engine 10, in the form of newly-obtained requested engine power levels, only cause changes to the position of the variable geometry mechanism when the power level difference exceeds the predetermined power threshold. This may be used to avoid changes to the position of the variable geometry mechanism in response to minor changes in engine power levels, which may not warrant commensurate changes in the position of the variable geometry mechanism, while maintaining such commensurate changes when the power level difference is significant enough, i.e. exceeding the predetermined power threshold.

In some embodiments, the predetermined power threshold is based on a percent-difference from the reference power level. For example, the predetermined power threshold is set at a 5% variation from the reference power level, or a 7% variation, or a 10% variation, or any other suitable percent-difference. In some embodiments, the percent-difference is made variable on one or more operating conditions of the engine 10 and/or one or more environmental conditions in which the engine 10 is operating.

Figure 3:
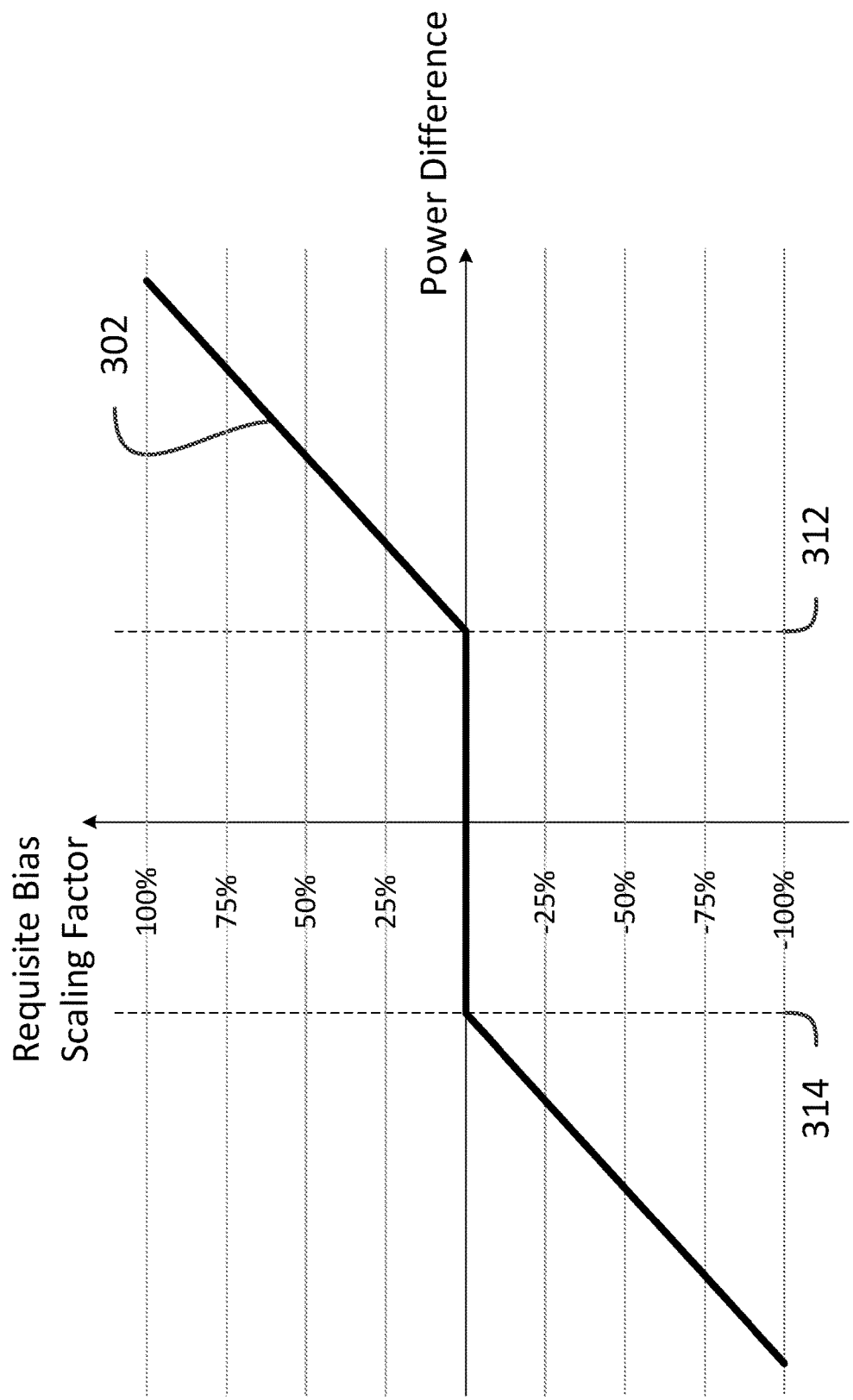
FIG. 3 is an example graphical representation of a requisite bias scaling factor.

With reference to FIG. 3, the scaling factor K is used to scale the requisite bias level based on the power difference, as illustrated by curve 302. The predetermined power thresholds are indicated by cutoff lines 312, 314. In this example, any power difference between cutoff lines 312 and 314 results in maintaining the steady-state position for the variable geometry mechanism, and power differences which exceed the thresholds illustrated by the cutoff lines 312, 314 are scaled by the scaling factor K to determine the requisite bias factor.

Figure 4:
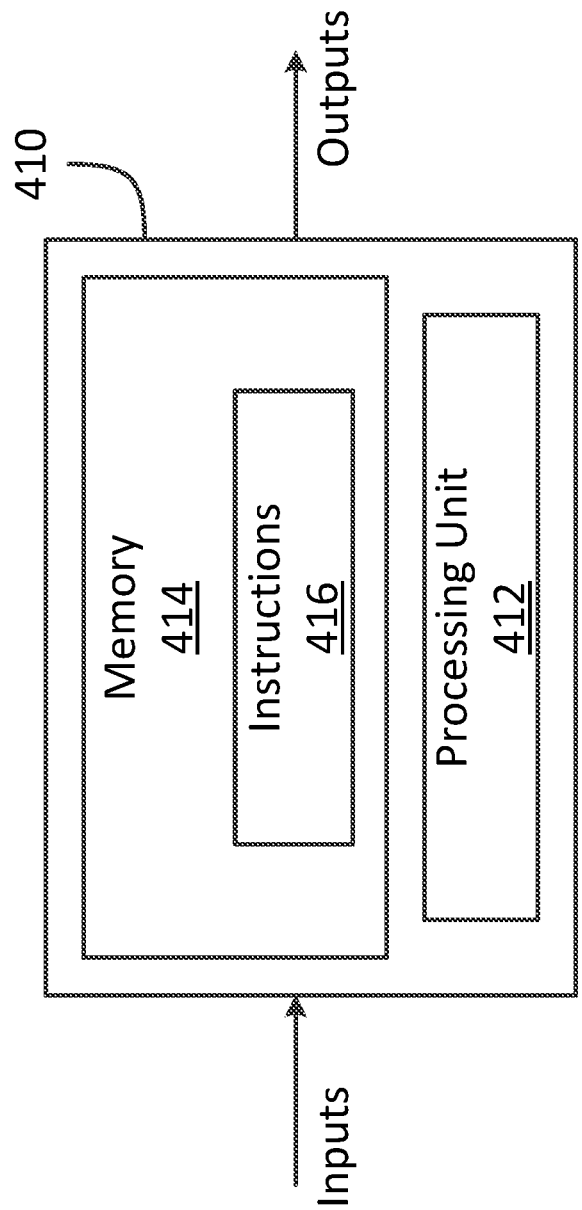
FIG. 4 is a block diagram of an example computer system for implementing the method of FIG. 2.

With reference to FIG. 4, the method 200 may be implemented by a computing device 410, comprising a processing unit 412 and a memory 414 which has stored therein computer-executable instructions 416. The processing unit 412 may comprise any suitable devices configured to implement the method 200 such that instructions 416, when executed by the computing device 410 or other programmable apparatus, may cause the functions/acts/steps performed as part of the method 200 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

Figure 5:
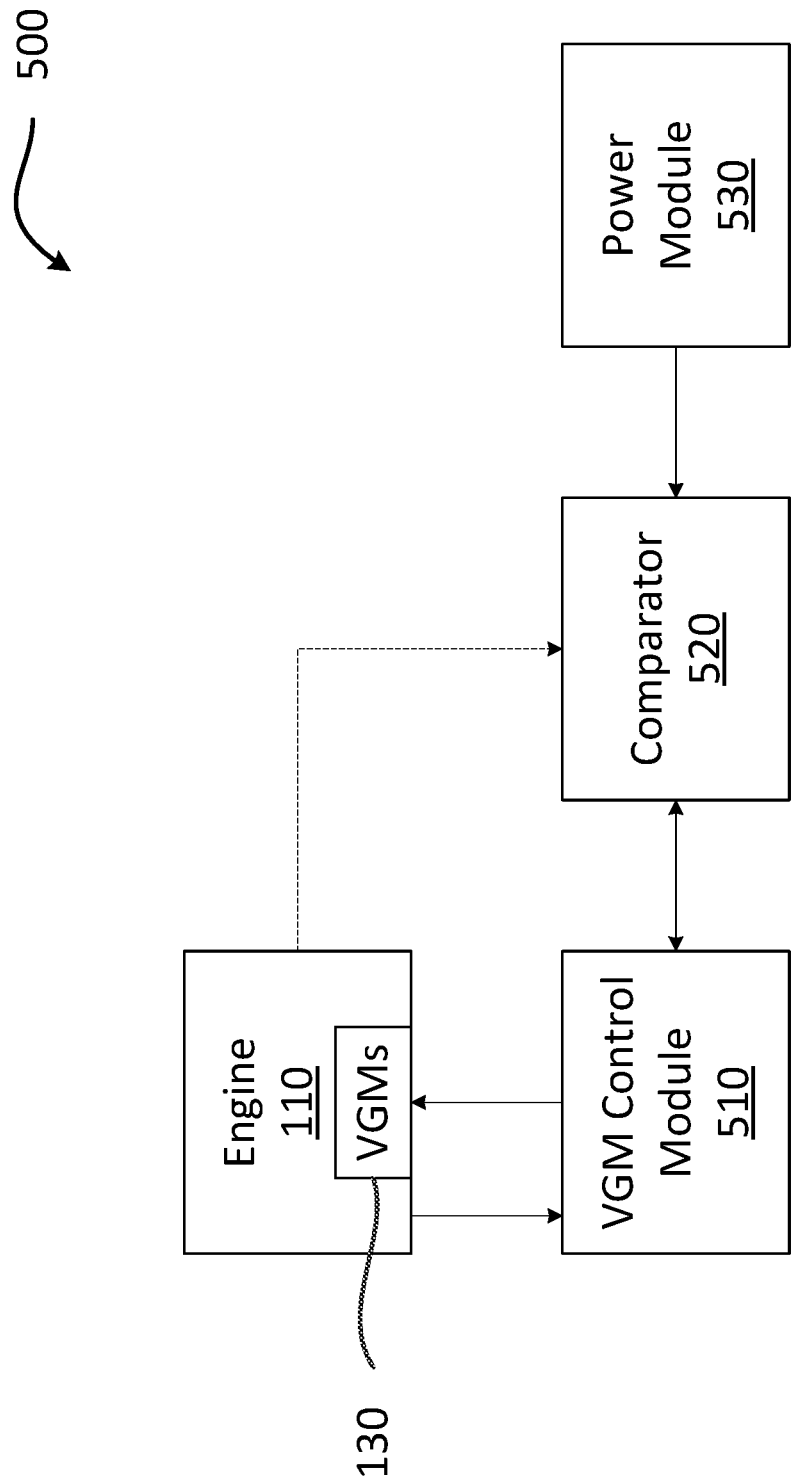
FIG. 5 is a block diagram of an example engine system.

With reference to FIG. 5, in some embodiments the engine 10 is part of an engine system 500 of an aircraft. The engine system 500 additionally includes a VGM control module 510, a comparator 520, and a power module 530. The engine 10 is communicatively coupled to the VGM control module 510 and optionally to the comparator 520. The VGM control module 510 is coupled to the comparator 520, which in turn is coupled to the power module 530.

As described hereinabove, in some embodiments the engine 10 includes one or more variable geometry mechanisms, illustrated here as VGMs 130. It should be noted that the VGMs 130 may include one or more VIGVs, for instance the VIGVs 51, one or more VGVs, for instance the VGVs 52, variable stator vanes, variable nozzles, variable bleed-off valves, and the like. The engine 10 is configured for producing power at a current engine power level, and is configured to report the current engine power level of the engine 10 to the VGM control module 510. Optionally, the engine 10 reports the current engine power level to the comparator 520.

The power module 530 is configured for obtaining signals indicative of requested changes in the power level of the engine 10 from one or more control systems and/or input devices. In some embodiments, the power module 530 receives inputs from a pilot or other operator of the aircraft provided via a thrust lever or other operator control. The power module 530 is configured for providing a requested engine power level to the comparator 520. In some embodiments, the signals received at the power module 530 are already indicative of the requested engine power level, and the power module 530 provides the requested engine power level to the comparator 520. In other embodiments, the signals received at the power module 530 are used to estimate or otherwise derive therefrom the requested engine power level.

The comparator 520 is configured for determining the power level difference between the requested engine power level and the current engine power level, as per step 202. In some embodiments, the comparator 520 obtains the current engine power level from the engine 10 via the VGM control module 510. In other embodiments, the comparator 520 obtains the current engine power level from the engine 10 substantially directly. In some embodiments, the comparator 520 collaborates with the power module 530 to obtain the requested power level, for example when the requested power level is estimated based on other information.

The comparator 520 is further configured for comparing the power level difference to the predetermined power threshold, as per step 204. In some embodiments, the comparator 520 is configured for determining the predetermined power threshold based on an operating condition of the engine 10, which may be obtained from the engine 10 via the VGM control module 510 or substantially directly. In other embodiments, the comparator 520 determines the predetermined power threshold via one or more lookup tables, databases, and the like. In embodiments where different predetermined power thresholds exist for positive and negative power level differences, the comparator 520 is configured for comparing the power level difference with the appropriate predetermined power threshold. For example, the comparator 520 may compare an absolute value of the power level difference to the negative predetermined power threshold.

The comparator 520 is additionally configured for implementing decision step 208. The comparator 520 is thus configured to communicate the result of the comparison between the power level difference and the predetermined power threshold to the VGM control module 510. In some embodiments, the comparator 520 provides the VGM control module 510 with an indication of the comparison. In other embodiments, the comparator 520 instructs the VGM control module 510 on which of steps 210 and 222 should be implemented by the VGM control module 510.

When the power difference exceeds the predetermined power threshold, the VGM control module 510 is configured for determining the requisite bias level for the VGMs 130 based on the power level difference, as per step 210. The VGM control module 510 may use any suitable lookup tables, algorithms, and the like to determine the requisite bias level. In some embodiments, determining the requisite bias level comprises scaling the power level difference by a factor associated with the maximum bias level and/or the reference power level, which may be based on operating conditions of the aircraft. In some embodiments, the VGM control module 510 is configured for obtaining and/or determining the maximum bias level based on the operating conditions of the aircraft.

The VGM control module 510 is further configured for generating and outputting a position control signal for the VGMs 130, based on the requisite bias level, as per step 212. The position control signal may be any suitable type of signal, encoded in any suitable format, and may be transmitted using any suitable communication medium to the engine 10, and in certain embodiments to the VGMs 130.

When the power difference does not exceed the predetermined power threshold, the VGM control module 510 is configured for maintaining the VGM 130 at the steady-state position, as per step 222. In some embodiments, the VGM control module 510 sends a steady-state position control signal to the engine 10, and in some instances the VGMs 130, to maintain the VGMs 130 at the steady-state position.

It should be noted that the VGM control module 510, and any other suitable elements of the engine system 500, may be implemented as part of a full-authority digital engine controls (FADEC) or other similar device, including electronic engine control (EEC), engine control unit (EUC), various actuators, and the like.

The methods and systems for controlling an engine described herein may be implemented in a high level procedural or object oriented programming or scripting language, or a combination thereof, to communicate with or assist in the operation of a computer system, for example the computing device 410. Alternatively, the methods and systems for controlling an engine may be implemented in assembly or machine language. The language may be a compiled or interpreted language. Program code for implementing the methods and systems for controlling an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for controlling an engine may also be considered to be implemented by way of a non-transitory computer-readable storage medium having a computer program stored thereon. The computer program may comprise computer-readable instructions which cause a computer, or more specifically the processing unit 412 of the computing device 410, to operate in a specific and predefined manner to perform the functions described herein, for example those described in the method 200.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for controlling an engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for controlling an engine having a variable geometry mechanism, comprising:
   determining, at a computing device, a power level difference between a requested engine power level and a current engine power level;

comparing, at the computing device, the power level difference to a predetermined power threshold;

determining, at the computing device, a requisite bias level by scaling the power level difference by a factor associated with a maximum bias level, the maximum bias level associated with an operating condition of the engine;

generating and outputting, at the computing device, a position control signal for changing a position of the variable geometry mechanism responsive to determining that the power level difference exceeds the predetermined power threshold, the position control signal generated based on the requisite bias level; and maintaining the variable geometry mechanism at a steady-state position responsive to determining that the power level difference does not exceed the predetermined power threshold.

2. The method of claim 1, wherein scaling the power level difference by the factor comprises determining the factor based on the maximum bias level and a reference power level associated with the operating condition of the engine.

3. The method of claim 1, wherein the predetermined power threshold is related to a reference power level associated with an operating condition of the engine.

4. The method of claim 1, further comprising determining, at the computing device, the predetermined power threshold based on an operating condition of the engine.

5. The method of claim 1, wherein obtaining the requested engine power level comprises estimating the requested engine power level.

6. The method of claim 1, wherein the position control signal is a first position control signal, wherein maintaining the variable geometry mechanism at the steady-state position comprises generating and outputting a second position control signal for the variable geometry mechanism based on an operating condition of the engine.

7. The method of claim 1, wherein the predetermined power threshold comprises a positive power threshold and a negative power threshold, and wherein comparing the power level difference to the predetermined power threshold comprises comparing the power level difference to the positive power threshold when the power level difference is positive and comparing the power level difference to the negative power threshold when the power level difference is negative.

8. An engine control system for a variable geometry mechanism, comprising:

a processing unit; and a non-transitory computer-readable memory communicatively coupled to the processing unit and comprising computer-readable program instructions executable by the processing unit for:

determining a power level difference between a requested engine power level and a current engine power level;

comparing the power level difference to a predetermined power threshold;

determining a requisite bias level by scaling the power level difference by a factor associated with a maximum bias level, the maximum bias level associated with an operating condition of the engine generating and outputting, at the computing device, a position control signal for changing a position of the variable geometry mechanism responsive to determining that the power level difference exceeds the predetermined power threshold, the position control signal generated based on the requisite bias level, the requisite bias level based on the power level difference; and maintaining the variable geometry mechanism at a steady-state position responsive to determining that the power level difference does not exceed the predetermined power level.

9. The system of claim 8, wherein scaling the power level difference by the factor comprises determining the factor based on the maximum bias level and a reference power level associated with the operating condition of the engine.

10. The system of claim 8, wherein the predetermined power threshold is related to a reference power level associated with an operating condition of the engine.

11. The system of claim 8, wherein the computer-readable program instructions are further executable by the processing unit for determining the predetermined power threshold based on an operating condition of the engine.

12. The system of claim 8, wherein obtaining the requested engine power level comprises estimating the requested engine power level.

13. The system of claim 8, wherein the position control signal is a first position control signal, wherein maintaining the variable geometry mechanism at the steady-state position comprises generating and outputting a second position control signal for the variable geometry mechanism based on an operating condition of the engine.

14. The system of claim 8, wherein the predetermined power threshold comprises a positive power threshold and a negative power threshold, and wherein comparing the power level difference to the predetermined power threshold comprises comparing the power level difference to the positive power threshold when the power level difference is positive and comparing the power level difference to the negative power threshold when the power level difference is negative.

* * * * *